(12) United States Patent
Alasaarela et al.

(10) Patent No.: US 7,628,940 B2
(45) Date of Patent: Dec. 8, 2009

(54) METHOD FOR MANUFACTURING THREE DIMENSIONAL OPTICAL COMPONENTS

(75) Inventors: Mikko Petteri Alasaarela, Oulu (FI);
Ilkka Antero Alasaarela, Oulu (FI)

(73) Assignee: Upstream Engineering Oy, Oulu (FI)

( * ) Notice: Subject to any disclaimer, the term of this patent is extended or adjusted under 35 U.S.C. 154(b) by 743 days.

(21) Appl. No.: 11/051,652

(22) Filed: Feb. 4, 2005

(65) Prior Publication Data

US 2005/0173048 A1   Aug. 11, 2005

(30) Foreign Application Priority Data

Feb. 9, 2004   (FI) .................................. 20040191

(51) Int. Cl.
*B29D 11/00*   (2006.01)
*G02B 5/04*   (2006.01)
*G02B 5/06*   (2006.01)

(52) U.S. Cl. ........................ 264/2.7; 264/1.31; 156/227; 359/1; 359/831; 359/832

(58) Field of Classification Search ................. 264/2.7, 264/1.31; 156/227; 359/831, 1, 832
See application file for complete search history.

(56) References Cited

U.S. PATENT DOCUMENTS

| | | | | |
|---|---|---|---|---|
| 3,834,789 A | 9/1974 | Brudy | ............................ | 350/97 |
| 5,008,496 A | 4/1991 | Schmidt et al. | .............. | 174/254 |
| 5,825,741 A | 10/1998 | Welch et al. | ................. | 369/112 |
| 6,021,106 A | 2/2000 | Welch et al. | ................. | 369/112 |
| 6,171,421 B1 * | 1/2001 | Murata et al. | ................. | 156/99 |
| 6,407,868 B1 | 6/2002 | Ishibashi et al. | ............. | 359/634 |
| 6,542,298 B1 | 4/2003 | Aoki | ............................ | 359/483 |
| 2002/0171938 A1 | 11/2002 | Nakajo et al. | ................ | 359/625 |
| 2003/0063388 A1 * | 4/2003 | Berman et al. | .............. | 359/618 |
| 2004/0219464 A1 | 11/2004 | Dunham et al. | .............. | 430/320 |

FOREIGN PATENT DOCUMENTS

| | | |
|---|---|---|
| GB | 1 211 027 | 11/1970 |
| JP | 04229244 | 8/1992 |
| JP | 10186112 | 7/1998 |

OTHER PUBLICATIONS

Ko et al., High-efficiency micro-optical color filter for liquid-crystal projection system applications, Applied Optics, vol. 39, No. 7, Mar. 1, 2000, p. 1159-1163.*

* cited by examiner

*Primary Examiner*—Carlos Lopez
*Assistant Examiner*—Cynthia Szewczyk
(74) *Attorney, Agent, or Firm*—Harrington & Smith, PC

(57) ABSTRACT

Disclosed is a method for manufacturing an optical component in three dimensions. In one aspect, the method includes providing a substrate that includes contiguous rigid plates that are disposed such that a major surface of each rigid plate lies substantially in a single plane. At least one of said surfaces is characterized by a micro-optical structure. Further in the method, the substrate is folded such that the at least one surface having a micro-optical structure and at least one other of the above-recited surfaces are disposed at an angle to one another. A second method is also disclosed. Disclosed structures made by the method(s) include a mesa structure with a top plate and four sidewall plates, each facing a reflective plate, as well as closed structures such as cubes and rectilinear boxes into which separate plates may be disposed. A mold for preferentially making the substrate such as by injection molding is also detailed.

29 Claims, 6 Drawing Sheets

US 7,628,940 B2

METHOD FOR MANUFACTURING THREE DIMENSIONAL OPTICAL COMPONENTS

PRIORITY STATEMENT AND CROSS REFERENCE TO RELATED APPLICATIONS

This application claims priority to Finnish Patent Application No. 20040191, filed on Feb. 9, 2004, and hereby incorporated by reference. Further, the subject matter of this invention is related to the subject matter of co-owned and co-pending U.S. patent application Ser. No. 10/622,296 that was filed on Jul. 17, 2003, and provisional U.S. Patent Application No. 60/638,911 that was filed on Dec. 23, 2004.

FIELD OF THE INVENTION

The present invention relates to a method for manufacturing three-dimensional optical components, preferably by injection molding.

DESCRIPTION OF THE RELATED ART

Currently, mass production methods for inserting micro-optics, diffractive optics or thin films on the surfaces of three-dimensional optical components are inefficient. If micro-optical, diffractive optical or thin film structures are needed in three-dimensional objects, the manufacturing is complex, costly and time consuming. The components are typically manufactured in several parts that are then assembled, for example by gluing. For example, manufacturing of cross-dichroic prisms (e.g. x-cubes) used in projection systems requires costly precision glass tooling. Additional optical functions such as light collecting Fresnel lenses have to be manually added on the surfaces. Each additional fabrication step and assembling step adds to manufacturing cost and defect rate.

Particularly in the consumer electronics market, consumers demand increasingly complex optoelectronic devices at lower cost. Lower cost components bearing micro-optics, diffractive optics and thin films would enable many new opto-electronic applications, especially if they could be made small and efficient such as a data projector within a mobile phone.

SUMMARY OF THE INVENTION

The present invention addresses the above problems as to complexity and cost in providing a method for manufacturing a three dimensional optical component.

In accordance with one aspect, the present invention is a method for manufacturing an optical component in three dimensions. The method includes providing a substrate that includes contiguous rigid plates that are disposed such that a major surface of each rigid plate lies substantially in a single plane. At least one of said surfaces is characterized by a micro-optical structure as defined herein. Further in the method, the substrate is folded such that the at least one surface having a micro-optical structure and at least one other of the above-recited surfaces are disposed at an angle to one another. As used herein, rigid means self-supporting over its length when held at an edge. Preferably, the substrate includes at least three rigid plates that are folded according to the method such that the at least one surface having a micro-optical structure and at least two other of the surfaces are each disposed at an angle to one another. Most preferably, there are five plates each defining a micro-optical structure, and are folded into a mesa structure.

In accordance with another aspect, the invention is a method for manufacturing a three-dimensional optical component. This method includes forming a layered substrate by adhering a flexible film to a plurality of spaced apart rigid plates. The layered substrate has micro-optical structures in at least one region defined by a planar surface of one plate. The micro-optical structures may be on a major surface of the plate itself, or may be on the region of the flexible film that is directly over or under a major surface of the plate. Further in this method, the layered substrate is folded between the plates such that said micro-optical structures each lie along an intended optical pathway through a completed optical component. An optical pathway is an intended optical pathway, not one of happenstance, and depends on the ultimate component.

In accordance with another aspect, the present invention is a three-dimensional optical component made by either of the methods recited above.

In another aspect, the present invention is a mold for efficiently making a substrate for an optical device. The mold includes a first and second casing and means for ejecting a rigid substrate from a cavity formed by the first and second casings. The first casing defines an interior surface characterized by a major planar area and, disposed along the major planar area, a mirror image of an intended micro-optical structure. The second casing is for mating with the first and defines a cavity with the first, where the cavity is bounded in part by the major planar area. At least one of the first and second casings defines an aperture for injecting a fluid material into said cavity.

DESCRIPTION OF THE PREFERRED AND ALTERNATIVE EMBODIMENTS

Figure 1A:
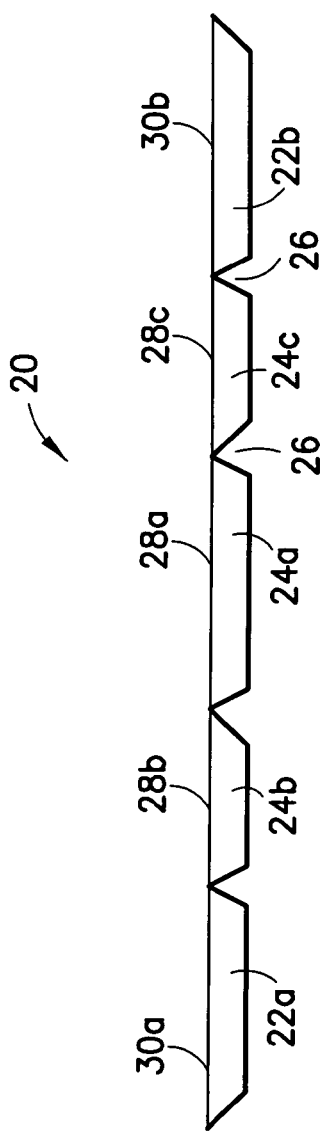
FIG. 1A is a sectional view of a substantially planar plastic substrate showing multiple rigid plates.

This disclosure and claims use the term micro-optical structure to refer to a broad array of optical apparatus that are used to purposefully manipulate light using structures that measure less than about 1 millimeter, and typically less than 250 microns. Examples include refractive or reflective micro-prisms, refractive micro-lenses, reflective micro-mirrors, Fresnel lenses or Fresnel mirrors, diffraction gratings of various types, optical thin film stacks (including antireflection coatings, dichroic filters and polarization beamsplitters), and other such physical structures, or arrays of these, that may be lased, etched, ground, pressed, embossed, deposited, evaporated, machined, molded, or otherwise physically formed on or in a host structure. Micro-optical structures can usually be manufactured on flat substrates (host structures) only, and that represents the most efficient means by which to make them. They may be also made onto a thin film, defined here as a substrate that is not self-supporting over its length (e.g., not rigid). It is more efficient to dispose those thin films, whether or not the films are patterned with micro-optical structures, onto a support substrate that lies flat to ensure proper alignment of the optical structures. The method of invention enables the manufacturing of complex three-dimensional components that incorporate such micro-optical structures on surface portions of a substrate. Those surface portions are defined by rigid plates, and the plates may then be folded into various positions and orientations so that either major surface of the plate is in a proper position relative to others.

The method of the invention preferably uses injection molding of plastic material to form a planar substrate used to make a three dimensional optical component. In a preferred embodiment, the substrate is in one piece and all rigid plates of the optical component are drawn from the same substrate without separation. Certain plates are folded and their mating edges are joined (at least those mating edges not contiguous when the substrate is in the planar form), such as by adhesive, localized melting, or a thin bonding sheet that couples adjacent surfaces. In another embodiment the substrate is two or more separate rigid plates such as glass or plastic, and the plates are held relative to one another by a flexible film applied to major surfaces of each plate to form a layered substrate. The layered substrate is then folded between the rigid plates form a single optical component.

In the preferred embodiment, building the optical components may be analogized to building a cardboard box from a single substrate by bending it along various lines the construct a three dimensional component. The present invention enables more than one micro-structure to be made onto a single substrate and the assembled whole to be made without separating each rigid plate that bears a different micro-optical structure. Preferably, all plates of the resulting component that bears an optical micro-structure are made from a single substrate, and most preferably, no plates are separated from the remainder of the substrate during manufacture. This enables manufacturing of all surfaces that bear the micro-structured optics onto one or only a few planar substrates. The micro-optical structures can be incorporated onto the substrate by, for example, embossing, etching, carving, laser milling, tooling, evaporating or sputter deposition. The micro-structures may be formed simultaneously with the forming of the substrate itself, such as where the substrate is injection molded and the mold itself defines the micro-structures onto the substrate. In each of the above, the micro-optical structures are formed on a surface of the substrate. Alternatively, the micro-optical structures may be formed in a thin film, which is then glued to a support substrate to form a cohesive planar substrate that bears the micro-optical structures.

Additionally, the assembled optical components may be built from sheets of substrates that include supporting mechanical structures or curved facets. These supporting structures may be used to hold other subcomponents, or to strengthen the resulting component mechanically. Curved plates can form for example a lens.

In another embodiment of the invention the assembled optical component is filled with an optical material, which can be for example plastic, liquid or gel. If transparent filling is used, the optical material preferably has a suitable (predetermined or intended) index of refraction in order to cause intended optical function in the assembled component. Preferably the index of refraction of the filling material is matched to that of the substrate.

The machine that carries the molds for injection molding can be a conventional machine or more preferably micro-injection molding machine, which allows more precise control of process parameters. There are a wide variety of plastics available for injection molding. Many of them can be used in the method of the invention. The plastics can be transparent or non-transparent depending of the function of the component. Transparent plastics known for optical uses include polycarbonate PC, polymethylmethacrylate PMMA, polystyrene PS, styrene methyl-methacrylate copolymer NAS, styrene acrylinitrile SAN, and cyclic olefin copolymer COC. A reflecting component can be molded from non-transparent plastics such as polyoxymethylene POM, for example.

The present invention will be described by way of non-limiting examples with reference to the accompanying drawings and exemplary components.

Figure 1D:
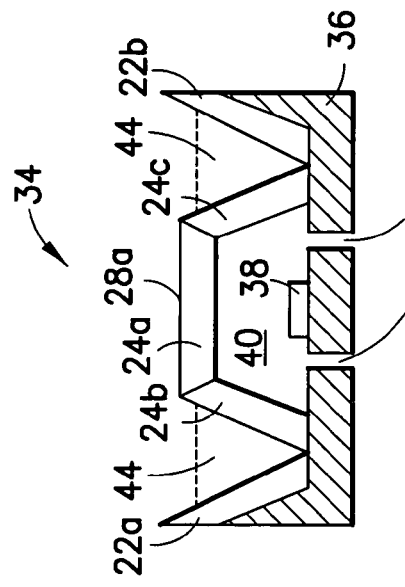
FIG. 1D is a sectional view of a fully fabricated optical component from FIGS. 1A-1C.
Figure 1C:
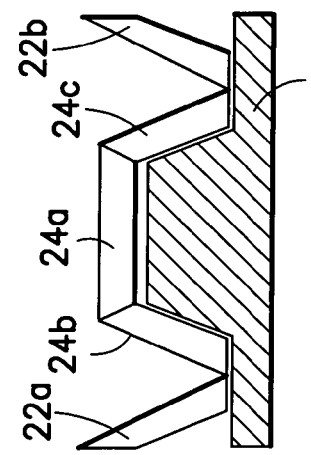
FIG. 1C is a sectional view of the mesa structure of FIG. 1B supported on an assembly mold.
Figure 1B:
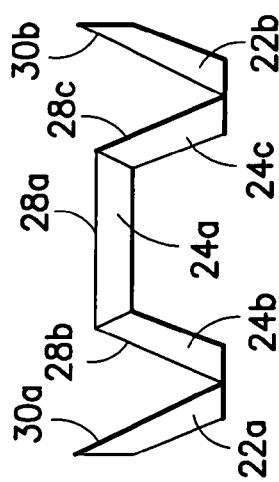
FIG. 1B is a sectional view of the substrate of FIG. 1A folded into a three-dimensional mesa structure.
Figure 2:
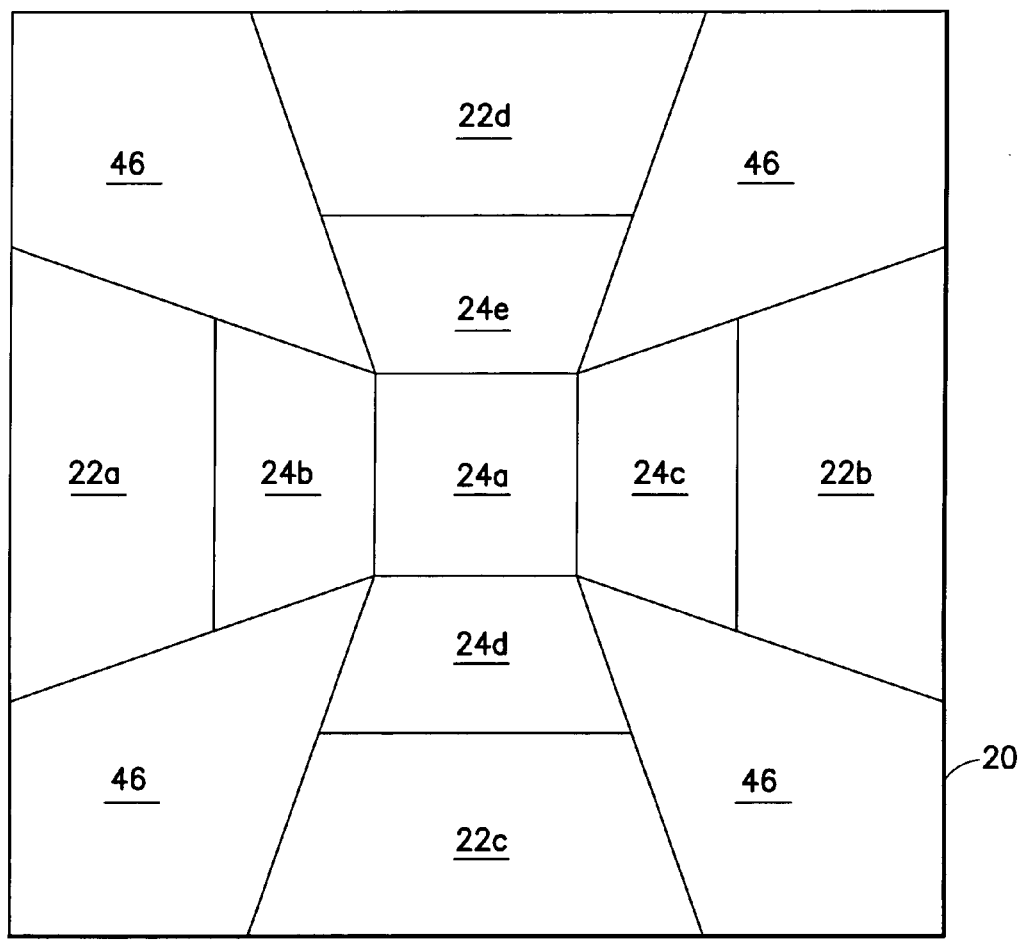
FIG. 2 is a plan view of the plastic substrate of FIG. 1A showing plate surfaces and waste sections.
Figure 3:
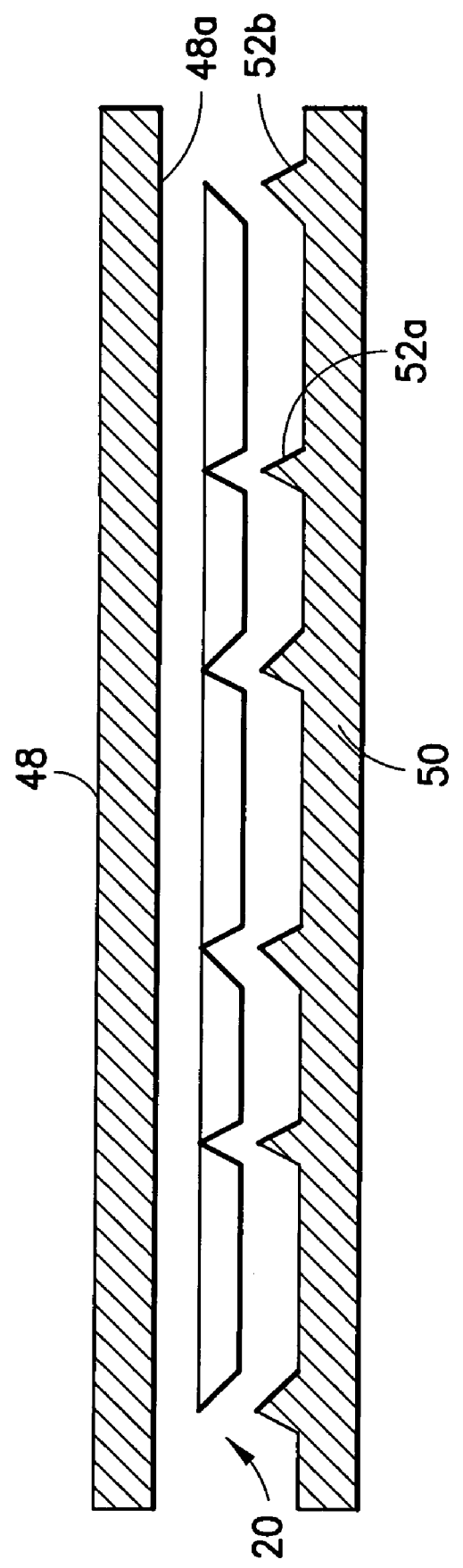
FIG. 3 is an exploded sectional view of the substrate of FIG. 1A within mold casing sections.

One embodiment of the present invention is illustrated in FIGS. 1-3 in which a beam shaping optical component 34 (FIG. 1D) is made from a substrate that defines micro-optical structures in a single plane, and filled with an optical fill material having an index of refraction generally matching that of the substrate.

FIG. 1A is a sectional view of a substantially planar plastic substrate 20 showing different plates 22*a-b*, 24*a-c*. The component 34 resulting from FIGS. 1-3 includes both refractive sections and reflective sections. To avoid confusion, plates with optically transmissive surfaces are given reference number 24 and plates with optically reflective surfaces are given reference number 22 (it is noted that where light passes through one surface of a plate and is reflected from the opposed surface, the one surface is still termed a reflective surface). Either a transmissive or a reflective surface may have a micro-optical structure. The substrate 20 defines grooves 26 that are linear and that divide the plates 22, 24 one from another. The grooves 26 enable the bending of the substrate 20 to re-orient the plates 22, 24 from a planar orientation to a three dimensional orientation. Preferably, the grooves 26 extend from a common surface of the substrate (lower surface as shown in FIG. 1A) and do not penetrate through the substrate, at least not along the entire length of the groove 26. So long as some substrate material couples one plate to another, the plates are contiguous and alignment of the various surfaces having micro-optical structures can be more readily accomplished during manufacture. When grooves 26 penetrate completely to the opposing surface (i.e., the upper surface of FIG. 1A) along its entire length, then different plates may become separated from one another and some manufacturing efficiency is lost. This represents an alternative embodiment, where a thin flexible film maintains the plates in relation to one another. In either case, at least one surface that bears a micro-optical structure lies in substantially the same plane as other major surfaces of other rigid plates. Where the substrate is layered and separate plates are joined by a thin film as in the alternative embodiment, or where a film is disposed over contiguous rigid plates separated by grooves as disposing the film over the preferred embodiment, the major surface of the rigid plate is considered that portion of the film directly overlying the plate itself. Prior to folding, major surfaces of the rigid plates all lie substantially in one plane. Preferably, all major surfaces on which micro-optical structures lie in the completed device or component lie in one plane before the substrate is folded (with the exception of separate plates that may be disposed within a cavity defined by the folded substrate). Alternatively, all such surfaces with micro-optical structures lie either on the one plane described above, or on a plane parallel to it and defined by the opposed major surfaces of the rigid plates.

Returning to the preferred embodiment, the substrate of FIG. 1A is folded in FIG. 1B along the grooves 26. Three optically transmissive facets 24a-c form a mesa structure, which in three dimensions is formed by five optically transmissive facets. Two plates 22a-b having reflective surfaces 30a-b flank the plates 24a-c having optically transmissive surfaces 28a-c (four in three dimensions). Where all refractive surfaces 28a-c lie within a single plane (upper surface of the substrate 20 in FIG. 1A), they form the exterior (sidewalls and top) of the mesa structure of FIG. 1B. Where the reflective surfaces 30a-b lie also in that same plane, they face refractive surfaces 28b, 28c that form sidewalls of the mesa structure. It is noted that where the material of the reflective plates 22a-b is itself reflective (as opposed to a coating applied to a plate surface), then both major surfaces of the reflective plate 22a-b is reflective. The term major surfaces as used herein in reference to the plates refers to the opposed surfaces with the highest surface area; plate edge surfaces are referred to as edges.

FIG. 1C is a sectional view of the mesa structure of FIG. 1B supported on an assembly mold 32. The assembly mold 32 is preferably used to retain the folded plates in a proper relative position while mating edges of the plates are bonded, as described below and with reference to FIGS. 5A-C. The assembly mold 32 may also be used as an object against which the various plates are pressed (or drawn via a vacuum) to achieve precision alignment.

FIG. 1D is a sectional view of a fully fabricated optical component 34 from FIGS. 1A-1D. The folded plates 22, 24 are disposed on a mount 36, on which is preferably affixed a light source 38 that lies within a cavity 40 bounded by the mesa structure and the mount 36. Vias 42 penetrate a base of the mount 36, and the cavity 40 is filled with an optical material that matches the index of refraction of the substrate (at least that portion of the substrate that forms the optically transmissive facets 24). A volume 44 surrounds the mesa structure like a moat, and is laterally bounded by the reflective 30a-b and refractive 28b-c surfaces of the facing plates 22a-b, 24b-c. This volume 44 may also be filled with an optical material of the same or different refractive index as that within the cavity 40 or a different refractive index. The reflective plates 22 may be sized so that their uppermost edges extend beyond a plane defined by the upper plate 24a of the mesa structure, so that the material used to fill the volume defined by the facing surfaces 28b-c, 30a-b may cover a horizontal refractive surface 28a of that top refractive plate 24a where desirable. The dimensions of the assembled component 34 can be from 10 mm to 30 mm width and from 4 mm to 10 mm height for example.

FIG. 2 is a plan view of the plastic substrate of FIG. 1A showing surfaces of the plates 22, 24 and waste sections 46. The optically transmissive plate 24a that was horizontal in the finished component of FIG. 1D is at the centre, and previously depicted plates are shown abeam that centre plate 24a. Additional transmissive plates 24d-e and reflective plates 22c-d are shown. When waste segments 46 are removed, it is clear that the substrate of FIG. 2 may be folded as in FIGS. 1A-C into a three dimensional mesa structure with flanking reflective plates 22a-d that face the refractive plates 24b-e that form the mesa sidewalls.

FIG. 3 is an exploded sectional view of the substrate of FIG. 1A, but juxtaposed between an upper first casing 48 and a lower second casing 50 that together form a mold. The casings 48, 50 mate to form a cavity into which material is injected to form the substrate 20. Within the cavity, a surface of the first casing 48 defines a major planar surface 48a or area that has a mirror image of the micro-optical structure of the substrate 20 to be formed. Protrusions 52a from an interior surface of the second casing 50 form the grooves 26. Edge protrusions 52b form mating edges that enable compactly arranging arrays of optical devices in mating fashion with one another. Alternatively, the second casing 50 does not form the grooves 26, but they are rather formed in the substrate 20 after injection molding by milling, lasing, etching, or otherwise ablating material from the substrate 20. It is preferable that the first casing 48 forms the micro-optical structures directly into one surface of the substrate 20 simultaneous with injection-molding the substrate 20, rather than ablating them after making the substrate 20 or making a support substrate onto which a thin flexible film that is affixed to the rigid plates. The second casing 50 may also include micro-optical structures. Most preferably, every surface of the completed optical component 34 that has a micro-optical structure lies substantially in the same plane defined by the major planar area 48a of the first casing 48. It is elementary to use multiple casings rather than only the two shown to perform the same function as described. One or more apertures are defined in one of the casings or in a mating edge of two or more casings for injecting the material that forms the substrate. Preferably, multiple apertures are so defined for micro-injection molding, to increase viable yield in fabricating precision components.

The mold also includes means for ejecting the substrate 20 therefrom. These are well known in the injection molding arts, and typically are termed ejector pins or ejector plates. In general, ejector pins/plates dislodge the molded piece from one of the casings after the injected material has hardened. As the second casing 50 of FIG. 3 has deeper protrusions, the substrate will likely stick to it when the casings 48, 50 are separated, so the ejector pins would extend from the second casing 50. Alternatively and much less commonly in the injection molding arts, a vacuum may be used to dislodge the hardened substrate, a sudden impact may be imposed on the periphery of the second casing 50, or protrusion may be formed in the substrate specifically for lifting it from the second casing. In the latter instance, the protrusion would generally be along a non-functional section of the substrate and would be removed in the finished product.

Figure 4:
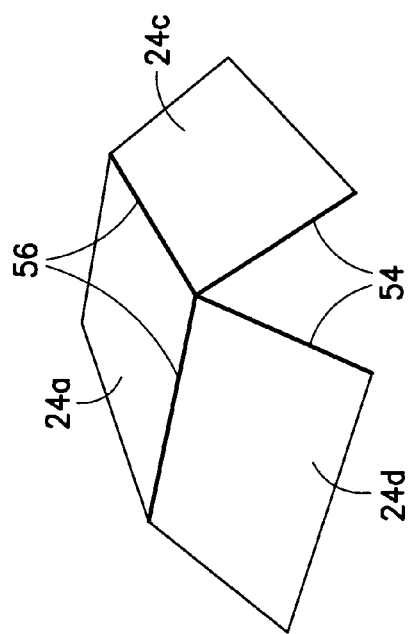
FIG. 4 shows three exemplary plates and joining of two mating edges thereof.

FIG. 4 shows three exemplary refractive plates 24a, 24c, 24d from the plan view of FIG. 2, and how mating edges 54 that do not share a groove are brought together. These are termed non-contiguous mating edges, as the different edges themselves do not mate with one another directly except after joining as below. The illustrated seams 56 represent lines along which the substrate was folded, and the plates that share a seam are not physically separated from one another so no joining process step is necessary at a seam. They may be joined as with the non-contiguous mating edges for a more secure seam.

Figure 5A:
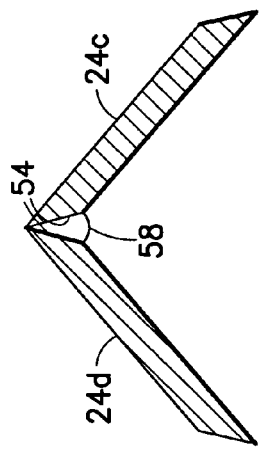
FIG. 5A illustrates mating the edges of FIG. 4 by gluing.
Figure 5B:
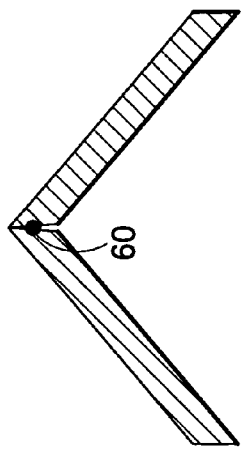
FIG. 5B illustrates mating the edges of FIG. 4 by localized melting.

FIGS. 5A-B each illustrate exemplary ways in which mating edges 54 may be permanently joined. In FIG. 5A, the mating edges 54 are joined by a separate adhesive 58 applied to the juncture. In FIG. 5B, the mating edges 54 are joined by localized heating applied to the juncture that causes the material along the edges to melt and fuse together. This may be accomplished by inserting a wire 60 between the mating edges, applying a voltage that causes the wire to heat, and snipping off excess wire after the edges 54 are fused. Alternatively, the wire may be used to directly conduct heat applied to an end thereof.

Figure 5C:
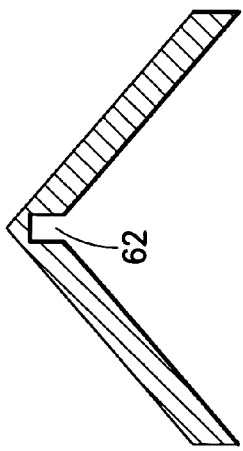
FIG. 5C illustrates two mating edges that form a support structure for a cross member of the optical component.

FIG. 5C illustrates two mating edges that, when brought together, form a support structure 62 for a separate element of the completed optical component, the separate optical element not being folded from the original substrate 20. The separate element may be, for example, a filter or half-silvered plate, as described below with respect to FIGS. 7-8. The support structure 62 may be formed in the mold by protrusions (not shown) similar to those depicted in FIG. 3 that form the grooves. The separate element may be made with the substrate 20 and separated therefrom during fabrication, or may be formed in a separate process.

Figure 8:
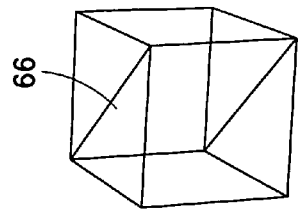
FIG. 8 is a perspective view of a polarizing beamsplitter made from the substrate of FIG. 6.
Figure 7:
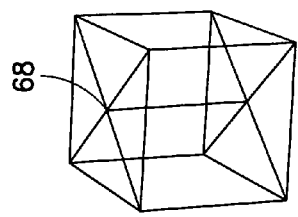
FIG. 7 is a perspective view of a cross dichroic mirror made from the substrate of FIG. 6.
Figure 10:
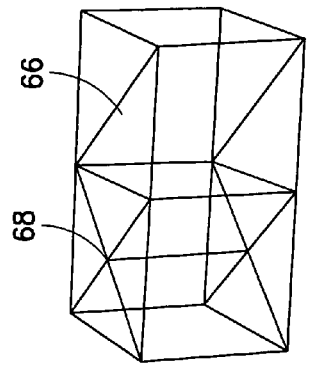
FIG. 10 is a perspective view of a combined cross-dichroic mirror and polarizing beamsplitter made from the substrate of FIG. 9.
Figure 9:
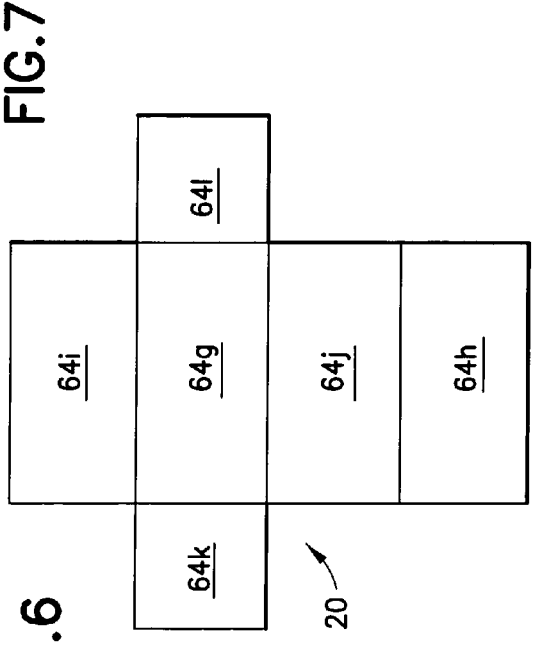
FIG. 9 is a plan view of a planar substrate with plate surfaces for making a rectangular optical component.
Figure 6:
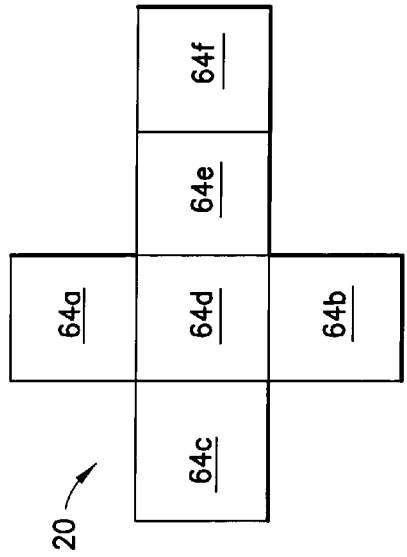
FIG. 6 is a plan view of a planar substrate with plate surfaces for making a cubical optical component.

FIG. 6 is a plan view of a planar substrate 20 similar to that of FIG. 2, but with plates 64 that define squares for making a cubical optical component. The various plates 64 may or may not all have micro-optical structures depending upon the intended use of the final component, and are termed for FIGS. 6-10 generically as plates 64. An upper 64a and lower 64b plate form the top and bottom of a completed component that defines an enclosed cube. Side plates 64c-e form the sidewalls through which light passes for being manipulated. Before the cube is fully closed, one or more cross members 66 are disposed within the cube to bisect it, preferably supported by the supporting members detailed above. The cross members are preferably planar, and may be glass, plastic, or other material not necessarily similar to that of the substrate 20. The sides of the cube can contain micro-optical structures, for example for collimating light from a point source. In FIG. 7, two such members are disposed in a fashion to intersect at an axis 68 parallel to four sides of the cube, and the completed component is a cross-dichroic mirror, commonly known as an x-cube. In FIG. 8, one such cross member 66, a polarizing mirror, is disposed to form a polarizing beamsplitter. Each of the closed bodies of FIGS. 7-8 use the substrate 20 of FIG. 6, and each may be filled with an index matching material for additional performance. The width of the assembled cube can be from 5 mm to 40 mm for example.

Figure 11:
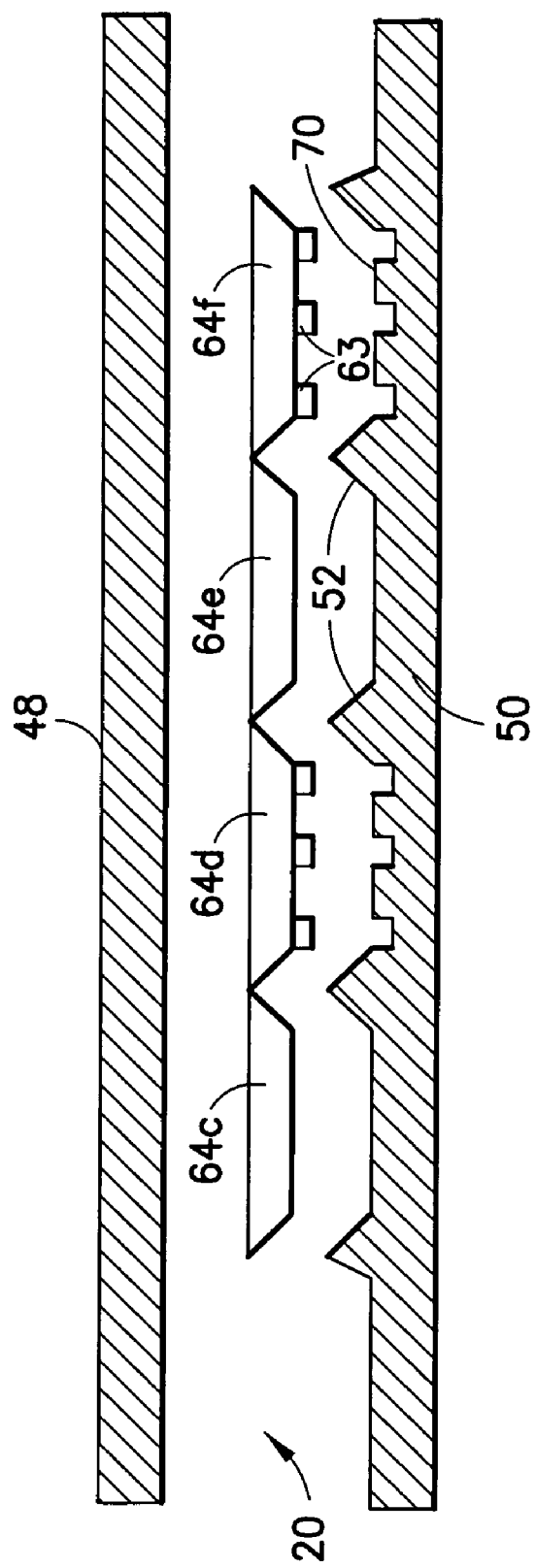
FIG. 11 is similar to FIG. 3 but for the substrate of FIG. 6 or 9, and showing further detail of support structures.

FIG. 11 is similar to FIG. 3 but for making the substrate of FIG. 6. FIG. 11 shows further detail of support structures (as compared to FIG. 3) formed by the second casing 50. As detailed with FIG. 3, the first casing 48 may define in the substrate 20 micro-optical structures when injection molding is used. The second casing 50 includes additional protrusions 70 that form perpendicular-mounting support structures 63 for optical subcomponents such as plastic or glass sheets that are mounted perpendicular to opposed plates of the closed body, rather than bisecting the closed body as previously illustrated. Functionally, these perpendicular-mounting support structures 63 are identical to the previously described support structures 62 at mating edges of plates, but in this instance, are along a major surface of the plates rather than along plate edges or seams.

Those skilled in the art will appreciate that the method of the present invention may be used when manufacturing wide range of optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting scope of the present invention. Other variations and modifications may be made in accordance with the spirit and scope of the present invention, and without departing from the ensuing claims.

What is claimed is:

1. A method for manufacturing an optical component in three dimensions comprising:
   providing a substrate comprising contiguous rigid plates and arranged such that a major surface of each rigid plate lies substantially in a plane, wherein at least one of said surfaces is characterized by a micro-optical structure;
   folding the substrate such that the at least one surface having a micro-optical structure and at least one other said surface are disposed at an angle to one another,
   wherein at least two of said rigid plates define one of a protrusion and a recession in one of the said major surface and an opposed major surface that, when folded, form a support structure for a separate optical plate.

2. The method of claim 1 wherein the substrate comprises at least three rigid plates, and wherein folding the substrate comprises folding such that the at least one surface having a micro-optical structure and at least two other said surfaces are each disposed at an angle to one another.

3. The method of claim 1 wherein the micro-optical structure is selected from at least one of the set: refractive micro-optical structure, reflective micro-optical structure, micro-prism, micro-mirror, micro-lens, Fresnel lens, Fresnel mirror, diffraction grating, and optical thin film stack.

4. The method of claim 1 wherein the substrate comprises a flexible film affixed to the rigid plates.

5. The method of claim 4 wherein the micro-optical structure is in the flexible film.

6. The method of claim 4 wherein the micro-optical structure is along a surface of a rigid plate.

7. The method of claim 1 wherein providing a substrate comprises forming the micro-optical structure while forming the substrate by an injection molding process.

8. The method of claim 1 wherein providing the substrate comprises molding the substrate and separately forming the micro-optical structure in the substrate.

9. The method of claim 1, wherein providing the substrate comprises adding one or more optical coatings on a surface thereof.

10. The method of claim 1 wherein the substrate defines grooves between each rigid plate.

11. The method of claim 10 wherein folding comprises folding the substrate along the said grooves.

12. The method of claim 10 further comprising, after folding:
    securing at least some mating plate edges to one another by one of adhesion and localized melting.

13. The method of claim 1 wherein all surfaces of a completed optical component that include micro-optics lay substantially in the said plane prior to folding, or in another plane that is, prior to folding, parallel to said plane.

14. A method of claim 1, further comprising:
    inserting a separate optical plate after the folding so as to be supported by the support structure.

15. The method of claim 1, wherein folding the substrate comprises folding so as to define a volume, the method further comprising:

at least partially filling the volume with a material having an intended index of refraction.

16. The method of claim 15, wherein filling the volume comprises disposing the folded substrate against an assembly mold and injecting under pressure the material having an intended index of refraction.

17. The method of claim 16, wherein injecting under pressure is through a via in the assembly mold.

18. The method of claim 16, wherein the material having an intended index of refraction is plastic, liquid or gel.

19. The method of claim 1 wherein at least five surfaces each have a micro-optical structure, and folding comprises folding such that each of the at least five surfaces are disposed at an angle to one another.

20. The method of claim 19 wherein said at least five surfaces define a mesa structure after folding.

21. The method of claim 1 wherein folding comprises folding the substrate into a hollow closed structure.

22. The method of claim 21 wherein the structure is substantially rectangular.

23. A method comprising,
providing a substrate comprising contiguous rigid plates and arranged such that a major surface of each rigid plate lies substantially in a plane, wherein at least one of said surfaces is characterized by a micro-optical structure; and
folding the substrate such that the at least one surface having a micro-optical structure and at least one other said surface are disposed at an angle to one another,
wherein providing the substrate comprises molding the substrate and separately forming the micro-optical structure in the substrate, and
wherein separately forming the micro-optical structure is by hot-embossing or by UV-embossing.

24. A method, comprising:
providing a substrate comprising contiguous rigid plates and arranged such that a major surface of each rigid plate lies substantially in a plane, wherein at least one of said surfaces is characterized by a micro-optical structure;
folding the substrate such that the at least one surface having a micro-optical structure and at least one other said surface are disposed at an angle to one another,
wherein at least five surfaces each have a micro-optical structure, and folding comprises folding such that each of the at least five surfaces are disposed at an angle to one another, and wherein said at least five surfaces define a mesa structure after folding;
disposing a light source within a cavity defined by the mesa structure; and
substantially filling said cavity with an optical material having a desired refractive index.

25. A method for manufacturing an optical component in three dimensions comprising:
providing a substrate comprising contiguous rigid plates and arranged such that a major surface of each rigid plate lies substantially in a plane, wherein at least one of said surfaces is characterized by a micro-optical structure;
folding the substrate such that the at least one surface having a micro-optical structure and at least one other said surface are disposed at an angle to one another, wherein at least five surfaces each have a micro-optical structure, and folding comprises folding such that each of the at least five surfaces are disposed at an angle to one another, wherein said at least five surfaces define a mesa structure after folding; and
disposing a plurality of additional plates, each having a reflective surface, about the mesa structure such that each surface that defines a sidewall of the mesa structure faces a reflective surface.

26. The method of claim 25, wherein the additional plates are additional rigid plates of the substrate, and the disposing comprises folding the additional plates relative to the said five surfaces.

27. The method of claim 25 further comprising:
filling, with an optical material having a desired refractive index, a volume bounded at least in part by the facing reflective surfaces and the sidewalls of the mesa structure.

28. A method comprising,
providing a substrate comprising contiguous rigid plates and arranged such that a major surface of each rigid plate lies substantially in a plane, wherein at least one of said surfaces is characterized by a micro-optical structure; and
folding the substrate such that the at least one surface having a micro-optical structure and at least one other said surface are disposed at an angle to one another,
wherein folding comprises folding the substrate into a hollow closed structure and,
wherein folding further comprises, prior to closing the structure, disposing a substantially planar cross member within the structure that diagonally bisects said closed rectangular structure.

29. The method of claim 28 wherein folding further comprises, prior to closing the structure, disposing two substantially planar cross members within the structure, each of said cross members diagonally bisecting said rectangular closed structure and intersecting one another.

* * * * *